(12) United States Patent
Warner et al.

(10) Patent No.: US 10,670,219 B2
(45) Date of Patent: Jun. 2, 2020

(54) AUTOMOTIVE LIGHTING

(71) Applicant: Valeo North America, Inc., Troy, MI (US)

(72) Inventors: Gavin Warner, Seymour, IN (US); Brant Potter, Seymour, IN (US); John Orisich, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/163,183

(22) Filed: Oct. 17, 2018

(65) Prior Publication Data

US 2020/0124244 A1    Apr. 23, 2020

(51) Int. Cl.
| | |
|---|---|
| *F21S 41/657* | (2018.01) |
| *B60Q 1/068* | (2006.01) |
| *B60Q 1/076* | (2006.01) |
| *B60Q 1/08* | (2006.01) |

(52) U.S. Cl.
CPC .......... *F21S 41/657* (2018.01); *B60Q 1/0683* (2013.01); *B60Q 1/076* (2013.01); *B60Q 1/08* (2013.01); *B60Q 2300/054* (2013.01)

(58) Field of Classification Search
CPC .. F21S 41/657; F21S 41/143; B60Q 2400/30; B60Q 1/08; B60Q 1/076; B60Q 1/0683; B60Q 2300/054; B60Q 2300/05; B60Q 2300/056; B60Q 2300/33; B60Q 2300/42
See application file for complete search history.

(56) References Cited

U.S. PATENT DOCUMENTS

| | | | |
|---|---|---|---|
| 8,511,874 B2* | 8/2013 | Nakada | F21S 41/147 |
| | | | 362/544 |
| 9,140,424 B2* | 9/2015 | Mochizuki | B60Q 1/143 |
| 9,512,972 B2* | 12/2016 | Suckling | F21S 41/663 |
| 10,119,669 B2* | 11/2018 | Arai | F21S 41/26 |
| 2008/0112173 A1 | 5/2008 | Dassanayake et al. | |
| 2014/0210342 A1 | 7/2014 | Zhuang et al. | |
| 2017/0067609 A1 | 3/2017 | Ichikawa et al. | |
| 2019/0001868 A1* | 1/2019 | Kaino | B60Q 1/1423 |

FOREIGN PATENT DOCUMENTS

| | | |
|---|---|---|
| EP | 2281718 A1 | 2/2011 |
| EP | 2295291 A1 | 3/2011 |

* cited by examiner

*Primary Examiner* — Peggy A Neils
(74) *Attorney, Agent, or Firm* — Valeo North America, Inc.

(57) ABSTRACT

In an automotive lighting apparatus lighting components generate respective light fields. The lighting components are aligned one with the others such that the light fields combine in a lighting profile having cutoff regions meeting a predetermined cutoff criterion. An actuator is mechanically coupled to a corresponding one of the lighting components to aim that lighting component in a direction other than that in which the lighting component was aligned. A control component operate the actuator to aim the lighting component in the direction other than that in which the lighting component was aligned so that the light fields of the lighting components combine in another lighting profile having cutoff regions meeting another cutoff criterion.

17 Claims, 13 Drawing Sheets

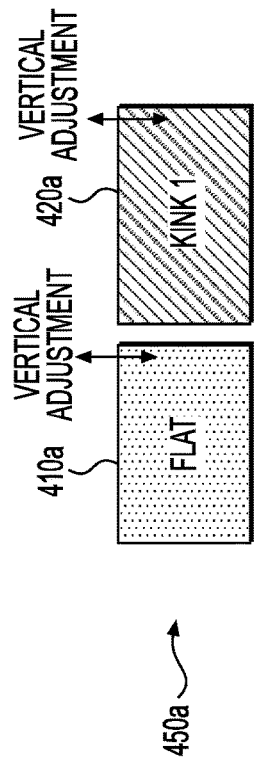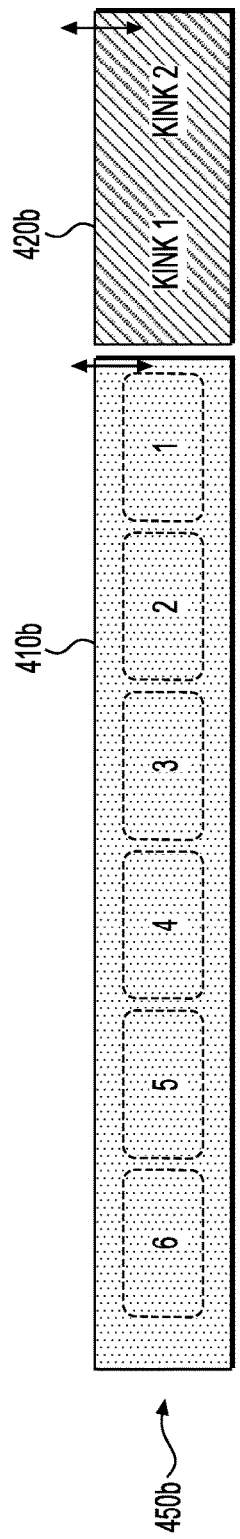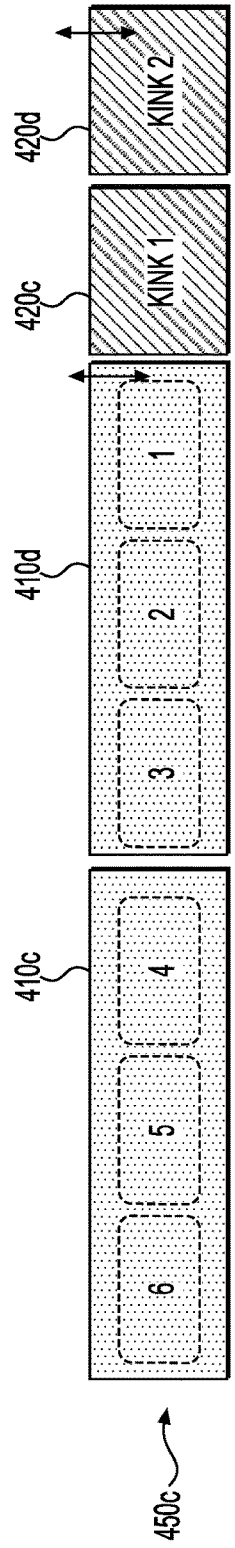

AUTOMOTIVE LIGHTING

BACKGROUND

Modern motor vehicles are equipped with a wide array of illumination devices that illuminate the exterior and interior of the vehicle. For example, exterior vehicle lighting devices perform stop lamp functions, tail lamp functions, headlamp functions, running light functions, dynamic bending light functions and fog lamp functions. Numerous studies have found that nighttime visibility is a key to highway safety.

To improve roadway safety, governments and other entities promulgate some form of safety regulations that specify motor vehicle lighting requirements. Such regulations help to ensure adequate illumination of the roadway and visibility of motor vehicles on the road so that their presence is apparent and their signals are understood in daylight, in darkness and in conditions of reduced visibility.

Most states, countries or regions which utilize motor vehicles have various requirements and standards that a vehicle must adhere to in order to legally use roadways within its jurisdiction. In the United States, Federal Motor Vehicle Safety Standard (FMVSS) No. 108 specifies various maximum and minimum photometric intensity values (based on angle) for headlamps of vehicles operated on its roadways. In addition to these requirements, the Insurance Institute for Highway Safety (IIHS) in the United States has its own set of tests and ratings (Headlight Test and Rating Protocol) for headlamp performance. The IIHS tests and ratings seek to encourage manufacturers to improve the illumination performance in actual on-road use. IIHS evaluations have shown that the on-road illumination provided by vehicle headlamps varies widely. In addition, IIHS has rated the majority of headlamps in a poor category (e.g., insufficient illumination, excessive glare, etc.).

The foregoing BACKGROUND section is provided for the purpose of generally presenting the context of the disclosure. Work of the presently named inventors, to the extent it is described in the BACKGROUND section, as well as aspects of the description which may not otherwise qualify as prior art at the time of filing, are neither expressly nor impliedly admitted as prior art against the present disclosure.

SUMMARY

In an automotive lighting apparatus lighting components generate respective light fields. The lighting components are aligned one with the others such that the light fields combine in a lighting profile having cutoff regions meeting a predetermined cutoff criterion. An actuator is mechanically coupled to a corresponding one of the lighting components to aim that lighting component in a direction other than that in which the lighting component was aligned. A control component operate the actuator to aim the lighting component in the direction other than that in which the lighting component was aligned so that the light fields of the lighting components combine in another lighting profile having cutoff regions meeting another cutoff criterion.

BRIEF DESCRIPTION OF THE DRAWINGS

FIGS. 4A-4C are diagrams illustrating lighting configurations in which the present inventive concept can be embodied.

DETAILED DESCRIPTION

Figure 1:
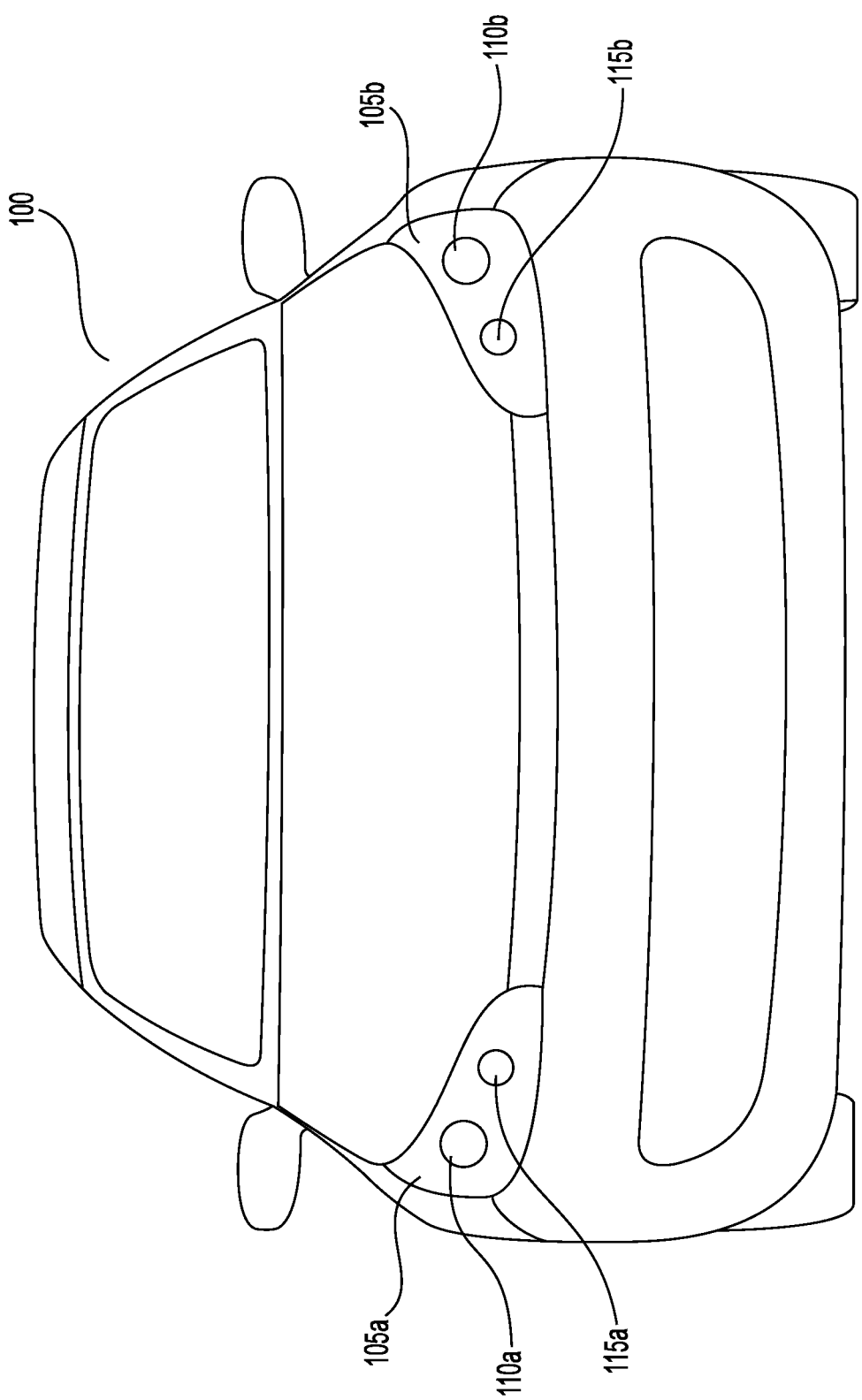
FIG. 1 is an illustration of an exemplary motor vehicle in which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

In the interest of conciseness and overall clarity, not all implementation details of the embodiments described herein are shown and described. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

FIG. 1 illustrates a front-end of an exemplary motor vehicle 100. Motor vehicle 100 includes two lamp assemblies 105*a* and 105*b*, representatively referred to herein as lamp assembly(-ies) 105. Lamp assemblies 105 include low beam headlamps 110*a* and 110*b*, representatively referred to herein as low beam headlamp(s) 110, and high beam headlamps 115*a* and 115*b*, representatively referred to herein as high beam headlamp(s) 115. Low beam aspects may also be referred to as lower or dipped beam aspects and high beam aspects may also be referred main or driving beam aspects. Typically, the low beam headlamps 110 are used whenever another vehicle is on the road directly ahead of motor vehicle 100 and/or whenever another vehicle is approaching motor vehicle 100 from an opposite direction. As will be discussed further below, low beam headlamps 110 may comprise multiple beam contributors that precisely establish the distribution and profile of the generated light.

It is to be understood that while motor vehicle 100 is illustrated as a passenger automobile, the present invention is not so limited. Other motor vehicles may embody the present invention, as will be apparent to the skilled artisan upon review of this disclosure.

Figure 2:
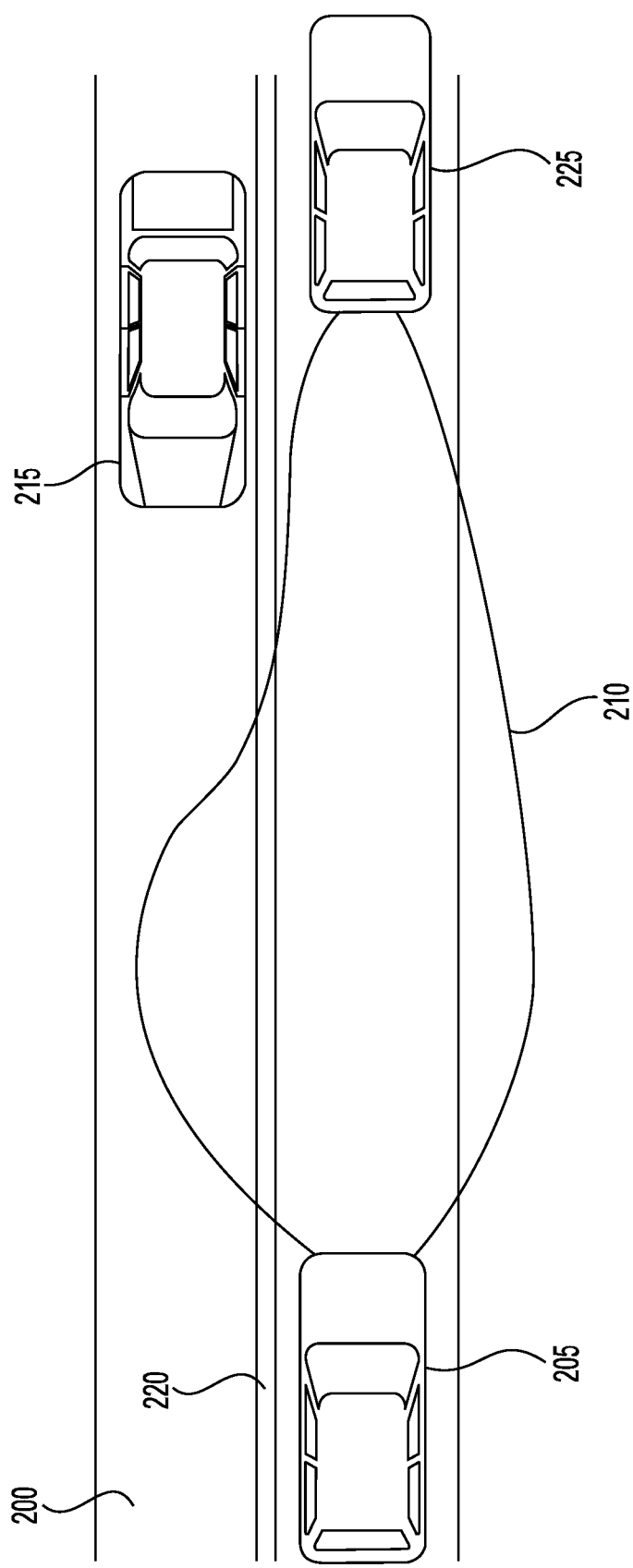
FIG. 2 is a schematic diagram of an exemplary roadway with motor vehicles travelling thereon that embody the present inventive concept.

FIG. 2 is a schematic diagram of an exemplary roadway 200, motor vehicle 205 and a light distribution pattern 210 for low beam headlamps of motor vehicle 205. Light distribution pattern 210 for the low beam headlamps of motor vehicle 205 can be optically designed to minimize the amount of light that crosses the centerline 220 of roadway 200 to reduce dazzle (a blinding effect from the headlights) to a driver of an oncoming motor vehicle 215. Additionally, a range of the low beam headlamps of motor vehicle 205 can be limited to reduce dazzle in the rear-view mirror for a driver of motor vehicle 225 directly ahead of motor vehicle 205 driving in the same direction.

Figure 3:
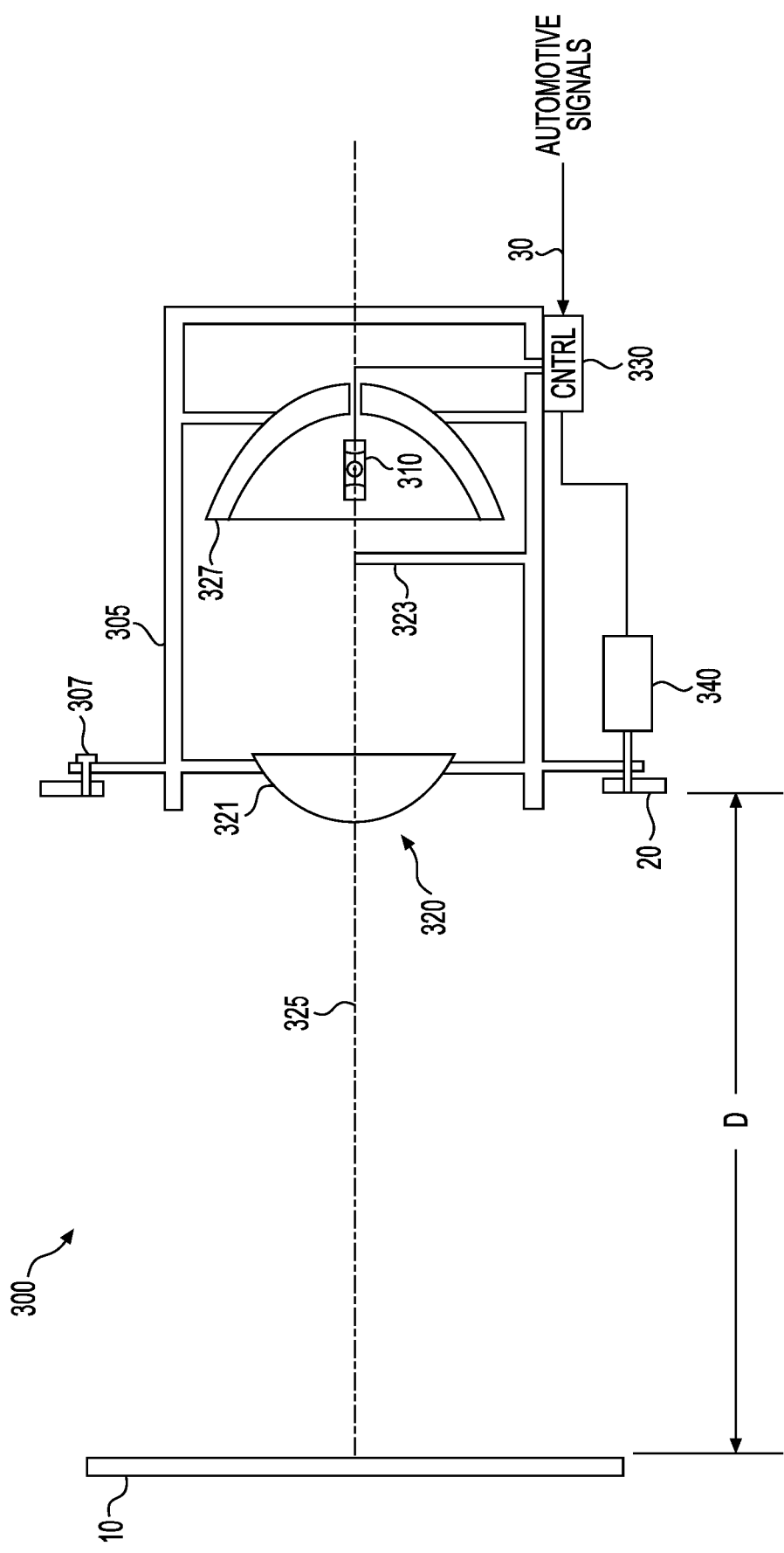
FIG. 3 is a schematic diagram, in cross section, of an exemplary lighting component in which the present inventive concept can be embodied.

FIG. 3 is a schematic diagram, in cross section, of an exemplary lighting component 300 in which the present invention can be embodied. A lighting component fulfilling the principles of lighting component 300 may be utilized in low beam headlamps 110 of FIG. 1. Generally, lighting component 300 comprises a chassis, such as enclosure 305, at least one light source, such as lamp 310, at least one optical system 320 mounted in enclosure 305, a controller 330 and at least one actuator, such as a motor 340. Optical system 320 may include various optical components including refractive elements, e.g., lens 321, reflective elements, e.g., reflector 327, various apertures, irises, filters, etc., e.g., cutoff shield 323, to form a particular lighting profile when evaluated on a screen 10 a distance D from the lighting component 300. The lighting profile, when lighting component 300 is properly aligned relative to the vehicle in which it is mounted (the vehicle is representatively illustrated at lighting mount 20), must have certain characteristics, such as light cutoff criteria in order to meet certain regional requirements, which may vary from region to region. It is to be understood that the present invention is not limited to particular optical configurations. Upon review of this disclosure, those having skill in the art will recognize various optical techniques by which the present invention can be implemented without departing from the spirit and intended scope thereof.

Lighting component 300 may include a static aiming mechanism, e.g., adjustment screw 307 and a dynamic aiming mechanism, e.g., motor 340. As used herein, static aiming is that conventional alignment performed while the vehicle is motionless and positioned according to predetermined alignment criteria and procedures, such as parked a certain distance D from screen 10. Adjustment screw 307 may be actuated to move lighting component 300 vertically and/or horizontally relative to the vehicle in which it is mounted. Those having skill in headlamp alignment will appreciate different procedures by which lighting component 300 can be statically aimed. It is to be understood that while only a single adjustment screw 307 is illustrated in FIG. 3, lighting component 300 may include multiple such screws and/or other mechanisms by which lighting component 300 is statically aimed.

As used herein, dynamic aiming refers to aiming of lighting component 300 while the vehicle is in motion. For example, in response to a command from controller 330, motor 340 may engage chassis 305 against vehicle mount 20 to rotate the lighting component 300 a predetermined angle from its statically-aimed position. Such command may be issued in response to information provided by the vehicle, such as might be conveyed in automotive signals 30. For example, automotive signals 30 may indicate the speed at which the vehicle is moving, whether high beams or low beams have been activated, etc. Controller 330 may take appropriate action, such as compelling dynamic aiming, based on the information contained or otherwise indicated in automotive signals 30.

Mechanisms other than those illustrated and described with reference to FIG. 3 may be used in embodiments of the present invention to statically and dynamically aim lighting component 300. Those having skill in the automotive lighting arts will recognize numerous adjustment and aiming techniques that can be used in embodiments of the present invention without departing from the spirit and intended scope thereof.

FIGS. 4A-4C are diagrams illustrating lighting configurations in which the present invention can be embodied. In the example embodiments, the lighting configurations include different combinations of beam contributors for low beam. These generally include both flat lighting components 410a-410d, representatively referred to herein as flat component(s) 410, and kink lighting components 420a-420d, representatively referred to herein as kink component(s) 420. Flat components 410 generally have wide beam angle 'spread' and produce a beam having a flat cutoff. kink components 420 in general have a narrow beam angle and produce a beam having a cutoff that has a step or angled portion to the right of the headlamps centerline. However, the present invention is not limited to these lighting profiles. Indeed, the present invention may incorporate many different configurations of beam contributors that produce lighting profiles other than those described herein.

In FIG. 4A, low beam headlamp 450a comprises one flat component 410a and one kink component 420a. In FIG. 4B, low beam headlamp 450b comprises one multi-segment flat component 410b and a multi-segment kink component 420b. In FIG. 4C, low beam headlamp 450c comprises multiple multi-segment flat components 410c and 410d and multiple kink components 420c and 420d. As is illustrated in the figures, certain flat components 410 and certain kink components 420 are displaceable and can be moved by command to alter distribution of light in the overall light field of the corresponding beam.

The diagrams of FIGS. 5A-8B represent, in simplified form, light fields of contributing lighting components to an overall light field of a low beam headlamp. As will be demonstrated through the figures, the light fields can be moved relative one to another, such as by dynamic aiming, to alter the luminous intensity distribution of the headlamp and thus the light pattern 210 illustrated in FIG. 2. Such movement may be achieved through suitable actuators coupled to flat components 410 and/or kink components 420, as described above.

Figure 5A:
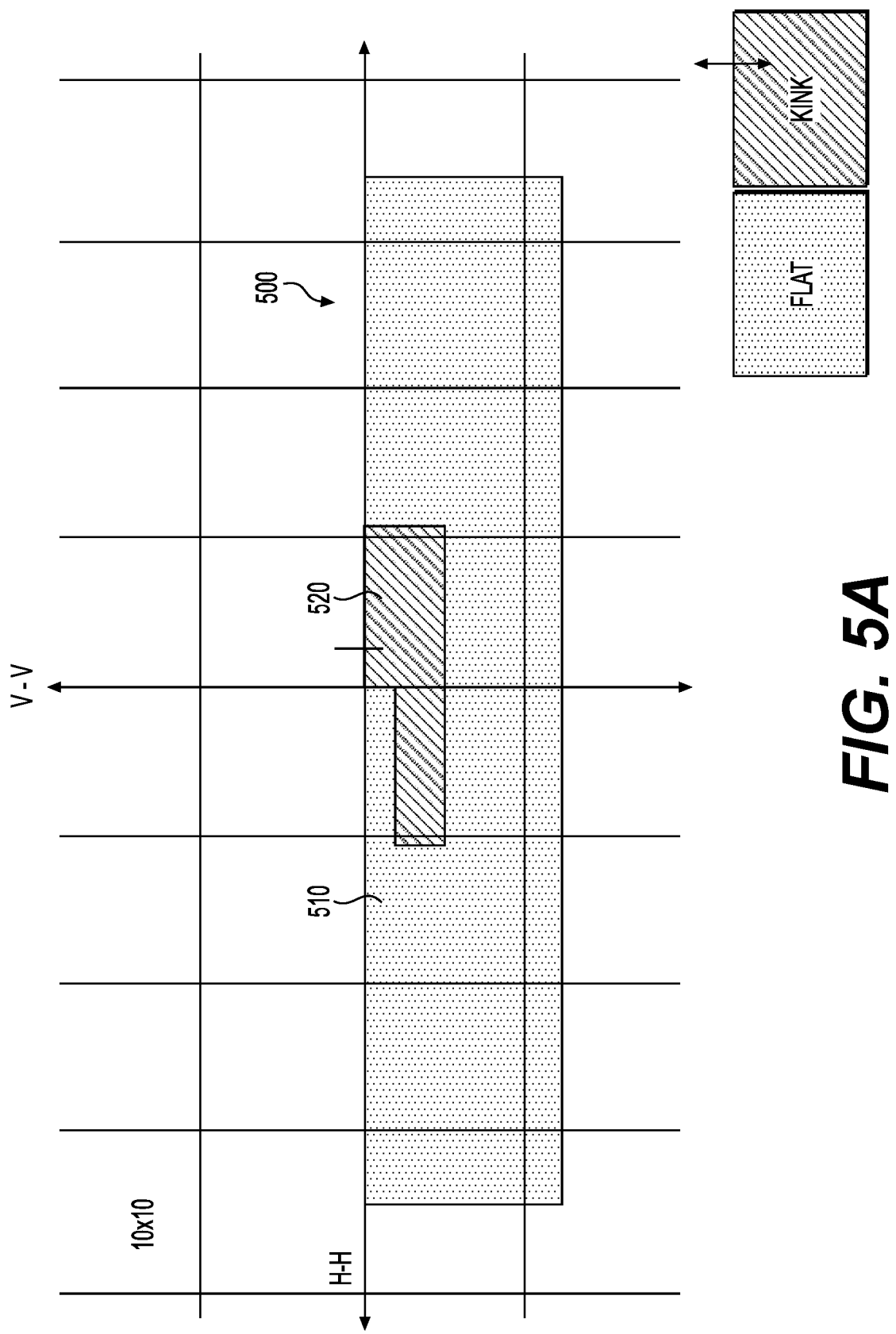
FIGS. 5A-5B are diagrams of exemplary light fields of a low beam headlamp according to embodiments of the present inventive concept.

FIG. 5A illustrates exemplary light fields of a low beam headlamp as seen or measured on a screen spaced apart from, and parallel to, the front (emitting) face of the headlamp. A horizontal axis H and vertical axis V are shown to identify horizontal and vertical planes intersecting both the center of the headlamp, noted as center 325 in FIG. 3, and the screen. In the example illustrated, light field 510 is generated by a flat component and light field 520 is generated by a kink component. The combined light fields are properly aligned on the grid, and hence on the vehicle, in accordance with visually optical aim (VOA) alignment criteria. VOA allows 2 types of cut-off types; a VOR type cut-off, and has a cutoff in the beam pattern located between 1°-3° right of the headlamp vertical axis and on the horizontal axis of the headlamp, and a VOL type cut-off that has a cut-off in the beam pattern between 1.5 L and 3.5 L at 0.4 deg down from the horizontal axis. In terms of performance, it is generally known that the VOR has better illumination and target detection on the left side of the road (opposing lane), and the VOL has better illumination and target detection on the right side (driving lane), but reduced detection distance on the left of vertical axis. The combined light field 500 illustrated in FIG. 5A results from static aiming of the headlamp. One goal of various invention embodiments is to have a beam pattern with the best attributes of VOR and VOL type patterns.

Figure 5B:
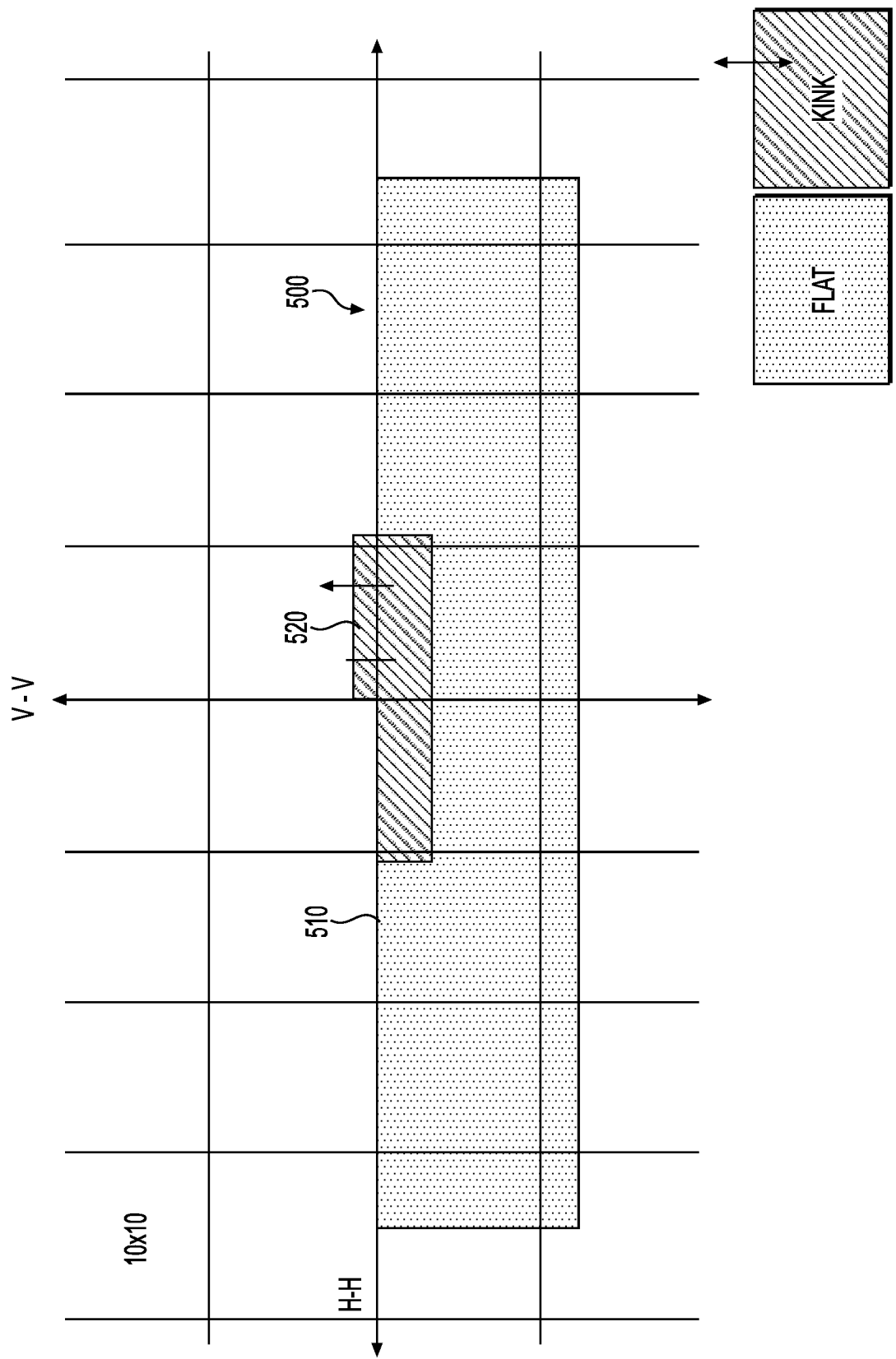

FIG. 5B illustrates the exemplary light fields of the low beam headlamp of FIG. 5A with the light fields redistributed by dynamic aiming, such as for driving on a roadway. As illustrated in the figure, the kink component has been rotated or otherwise displaced to raise the kink light field upwards by 0.2°. This increases the forward reach of the low beam headlamp while conforming to FMVSS No. 108.

Figure 6A:
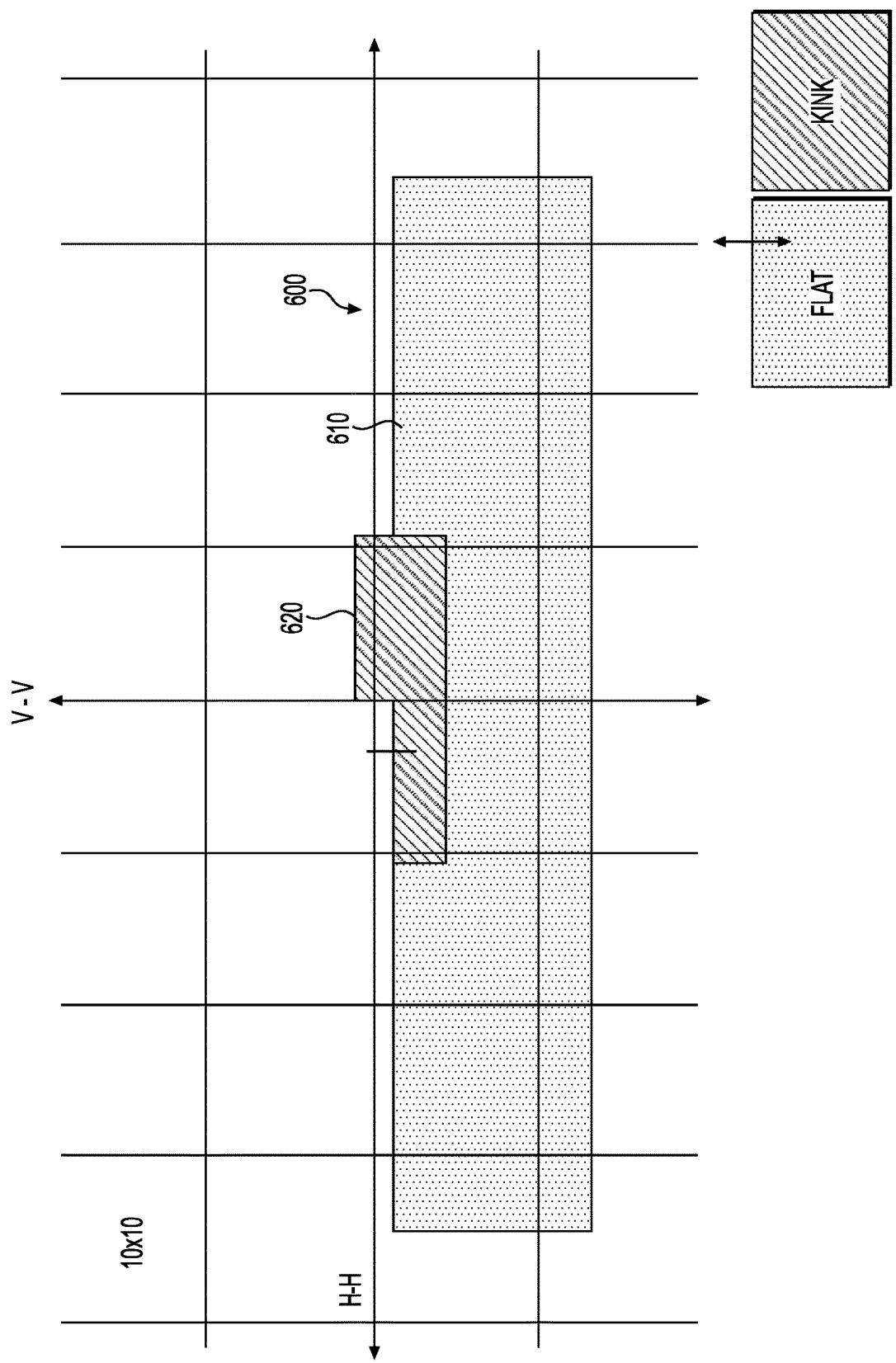
FIGS. 6A-6B are diagrams of exemplary light fields of a low beam headlamp according to embodiments of the present inventive concept.

FIG. 6A illustrates exemplary light fields of a low beam headlamp as seen or measured on the screen described above. In the example illustrated, light field 610 is generated by a flat component and light field 620 is generated by a kink component. The combined light fields are properly aligned on the grid, and hence in the vehicle, in accordance with visually optical left (VOL) alignment criteria (a VOL headlamp has a light gradient or cutoff in the beam pattern located 1.5°-3.5° left of the headlamp vertical axis and 0.4° below the horizontal axis of the headlamp.). The combined light field 600 illustrated in FIG. 6A results from static aiming of the headlamp.

Figure 6B:
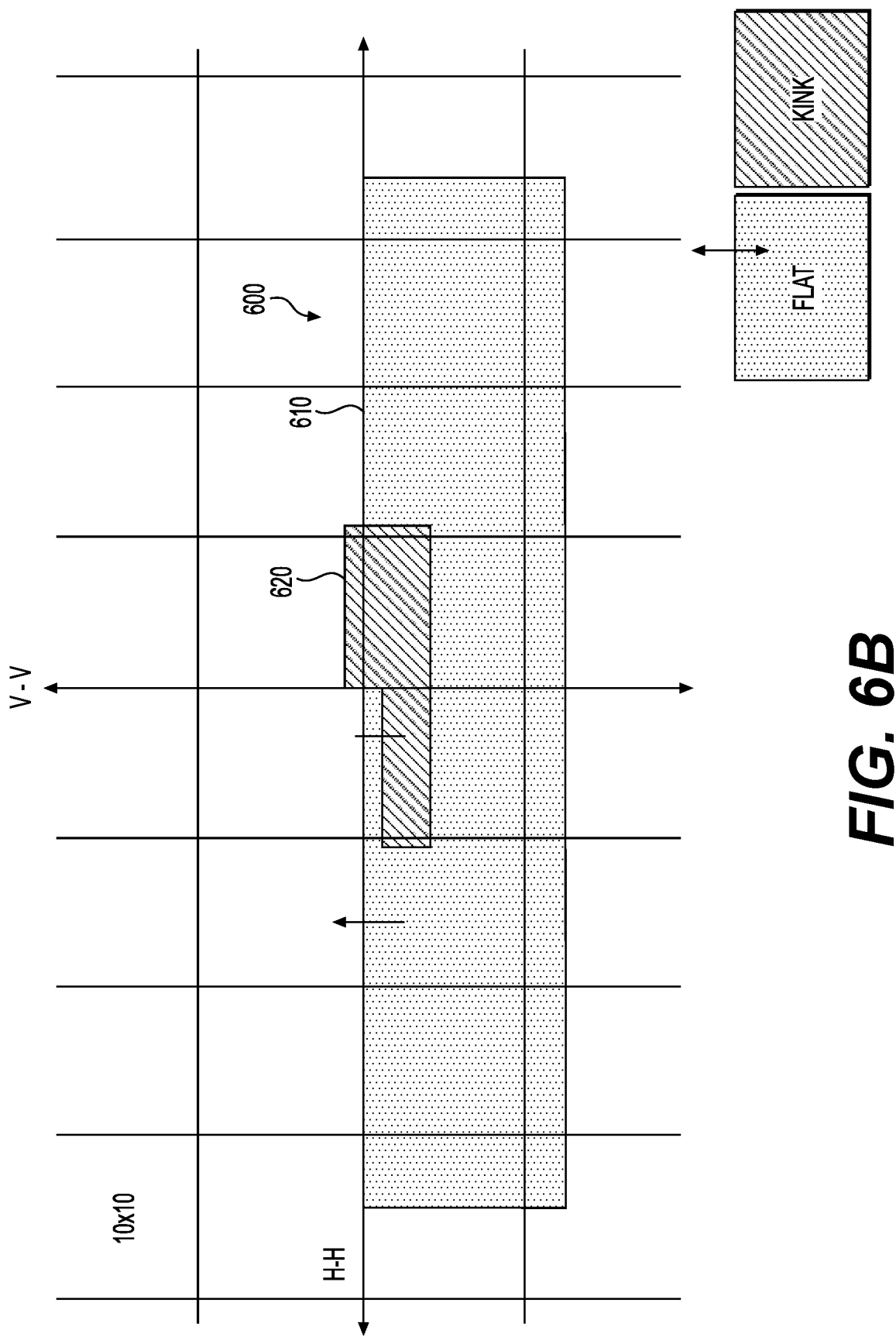

FIG. 6B illustrates the exemplary light fields of the low beam headlamp of FIG. 6A with the light fields redistributed by dynamic aiming, such as for driving on a roadway. As illustrated in the figure, the flat component has been rotated or otherwise displaced to raise the flat light field upwards by 0.4°. This increases the forward reach on the left side of the road of the low beam headlamp while conforming to FMVSS No. 108.

Figure 7A:
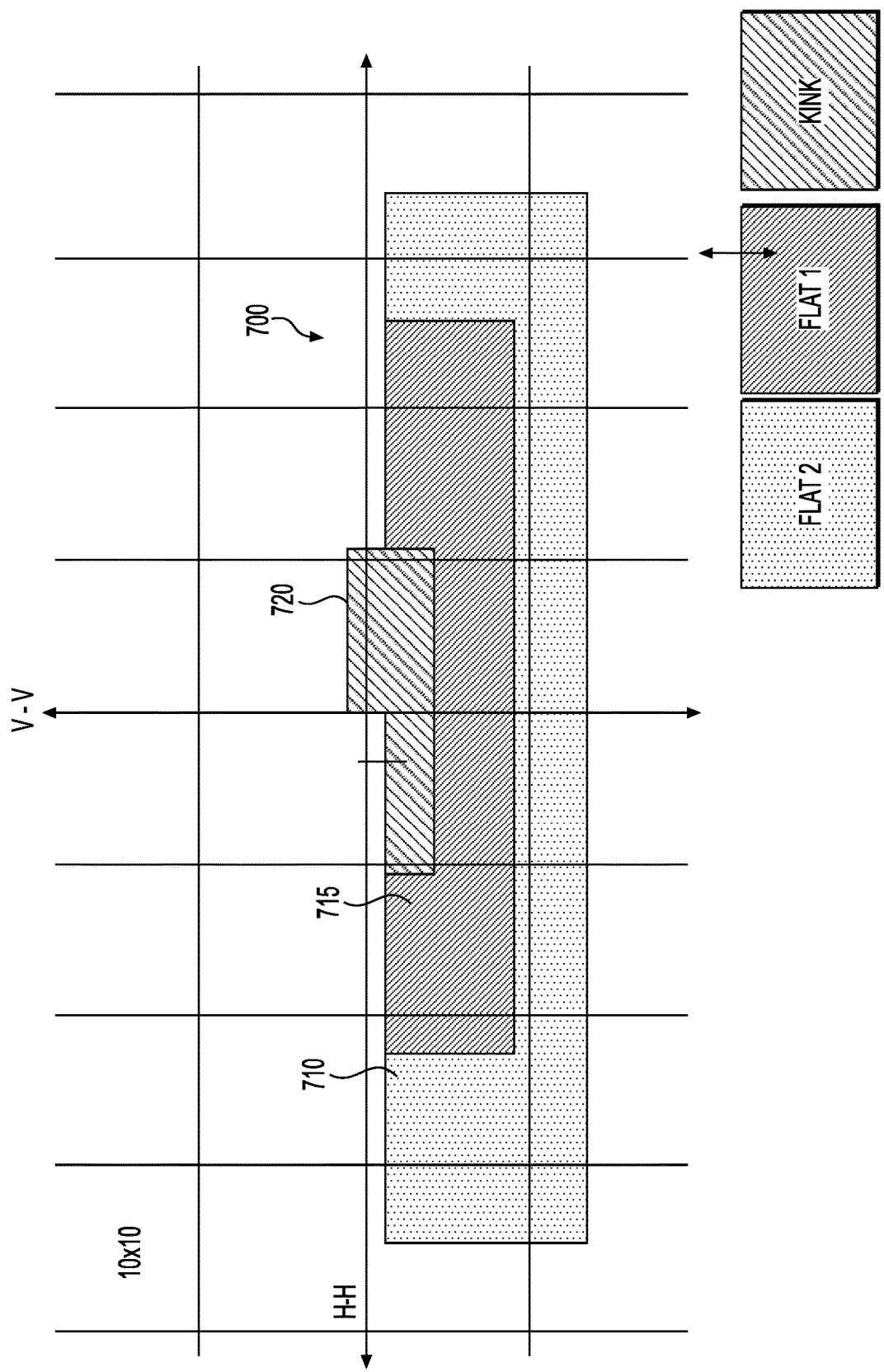
FIGS. 7A-7B are diagrams of exemplary light fields of a low beam headlamp according to embodiments of the present inventive concept.

FIG. 7A illustrates exemplary light fields of a low beam headlamp as seen or measured on the screen described above. In the example illustrated, light field 710 is generated by a flat component, light field 715 is generated by another flat component and light field 720 is generated by a kink component. The combined light fields are properly aligned on the grid, and hence in the vehicle, in accordance with VOL alignment criteria. The combined light field 700 illustrated in FIG. 7A results from static aiming of the headlamp.

Figure 7B:
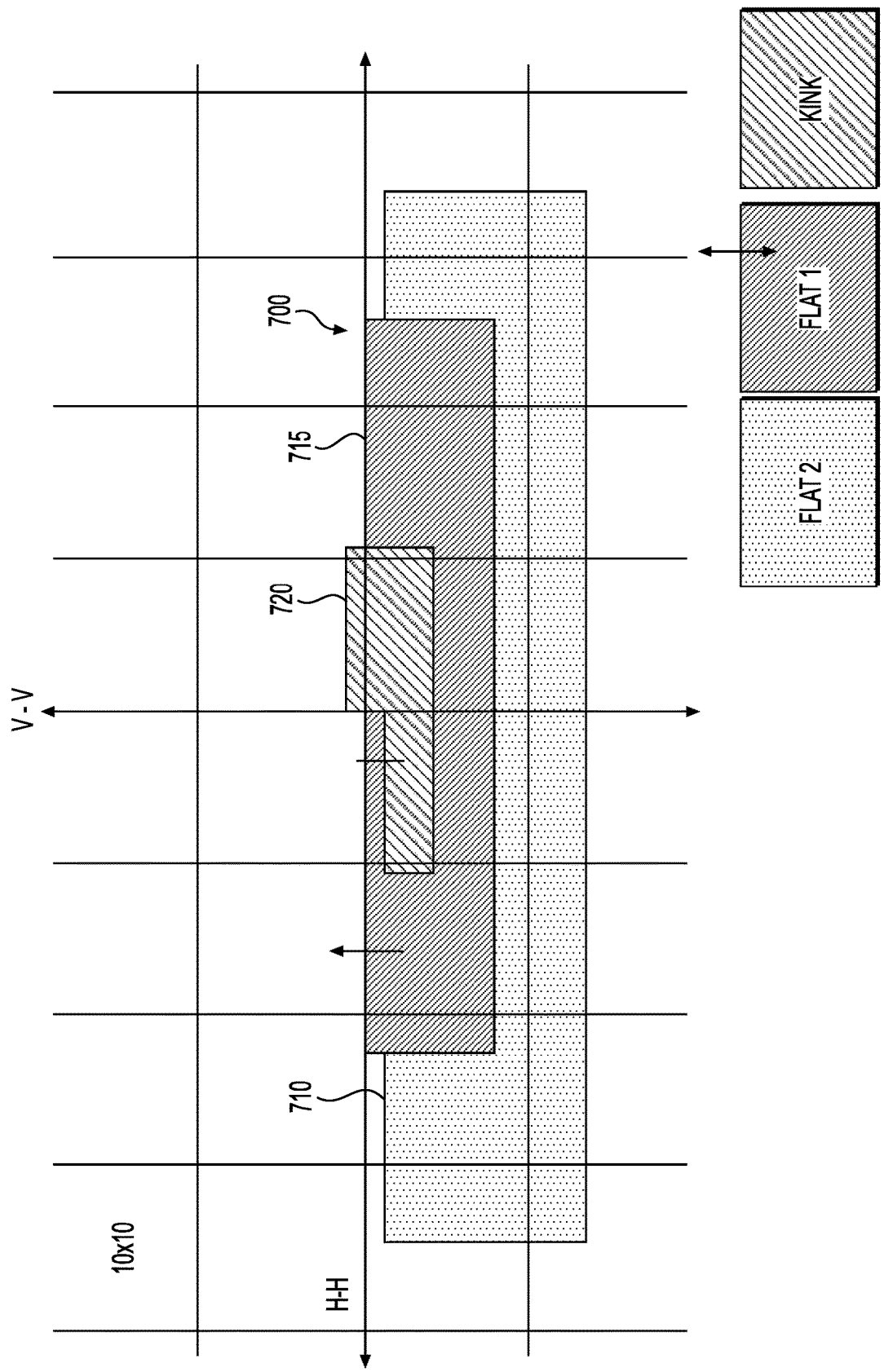

FIG. 7B illustrates the exemplary light fields of the low beam headlamp of FIG. 7A with the light fields redistributed by dynamic aiming, such as for driving on a roadway. As illustrated in the figure, one of the flat components has been rotated or otherwise displaced to raise the corresponding flat light field 715 upwards by 0.4°. This increases the forward reach of the low beam headlamp while conforming to FMVSS No. 108.

Figure 8A:
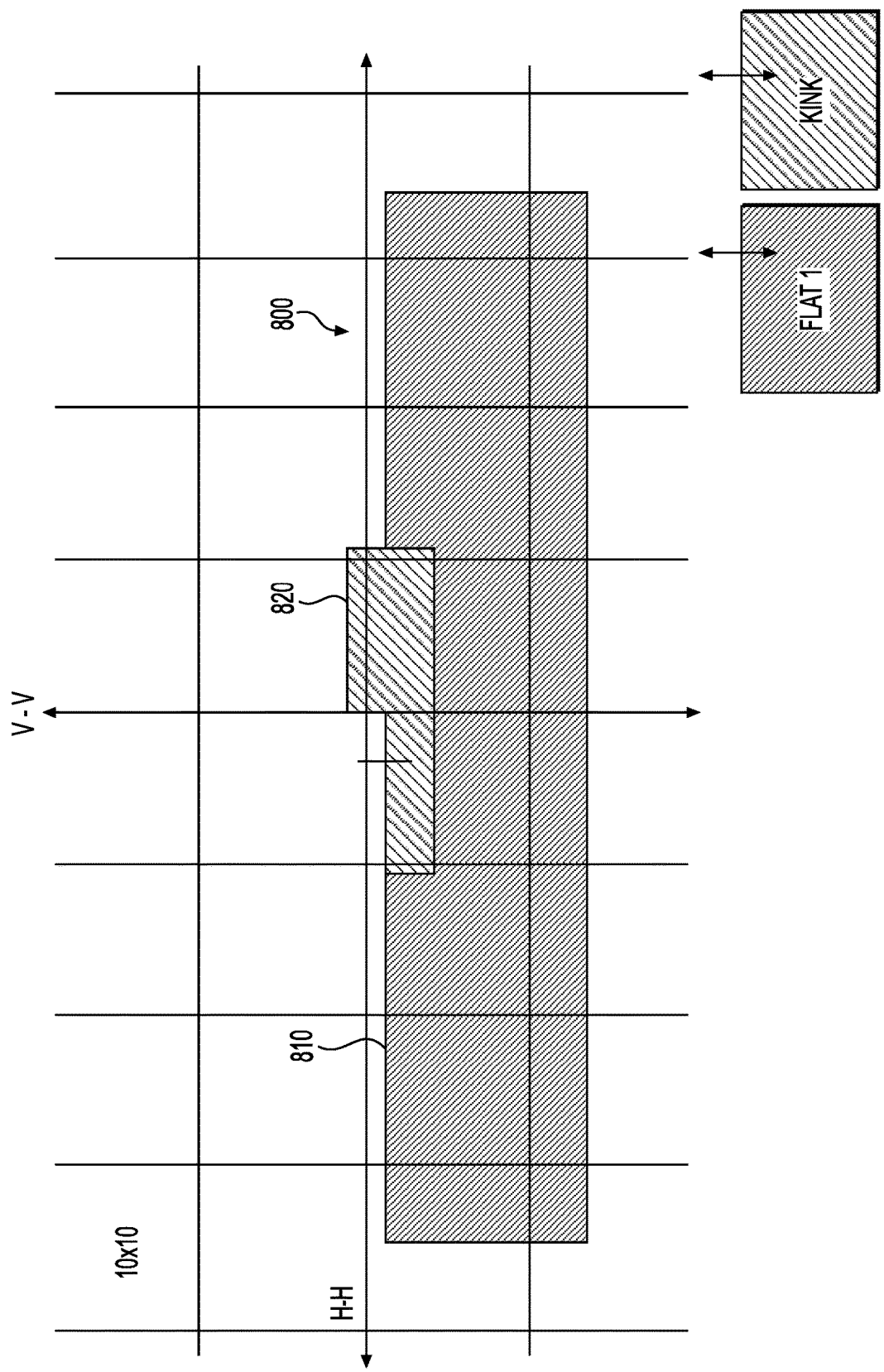
FIGS. 8A-8B are diagrams of exemplary light fields of a low beam headlamp according to embodiments of the present inventive concept.

FIG. 8A illustrates exemplary light fields of a low beam headlamp as seen or measured on the screen described above. In the example illustrated, light field 810 is generated by a flat component and light field 820 is generated by a kink component. The combined light fields are properly aligned on the grid, and hence in the vehicle, in accordance with VOL alignment criteria. The combined light field 800 illustrated in FIG. 8A results from static aiming of the headlamp.

Figure 8B:
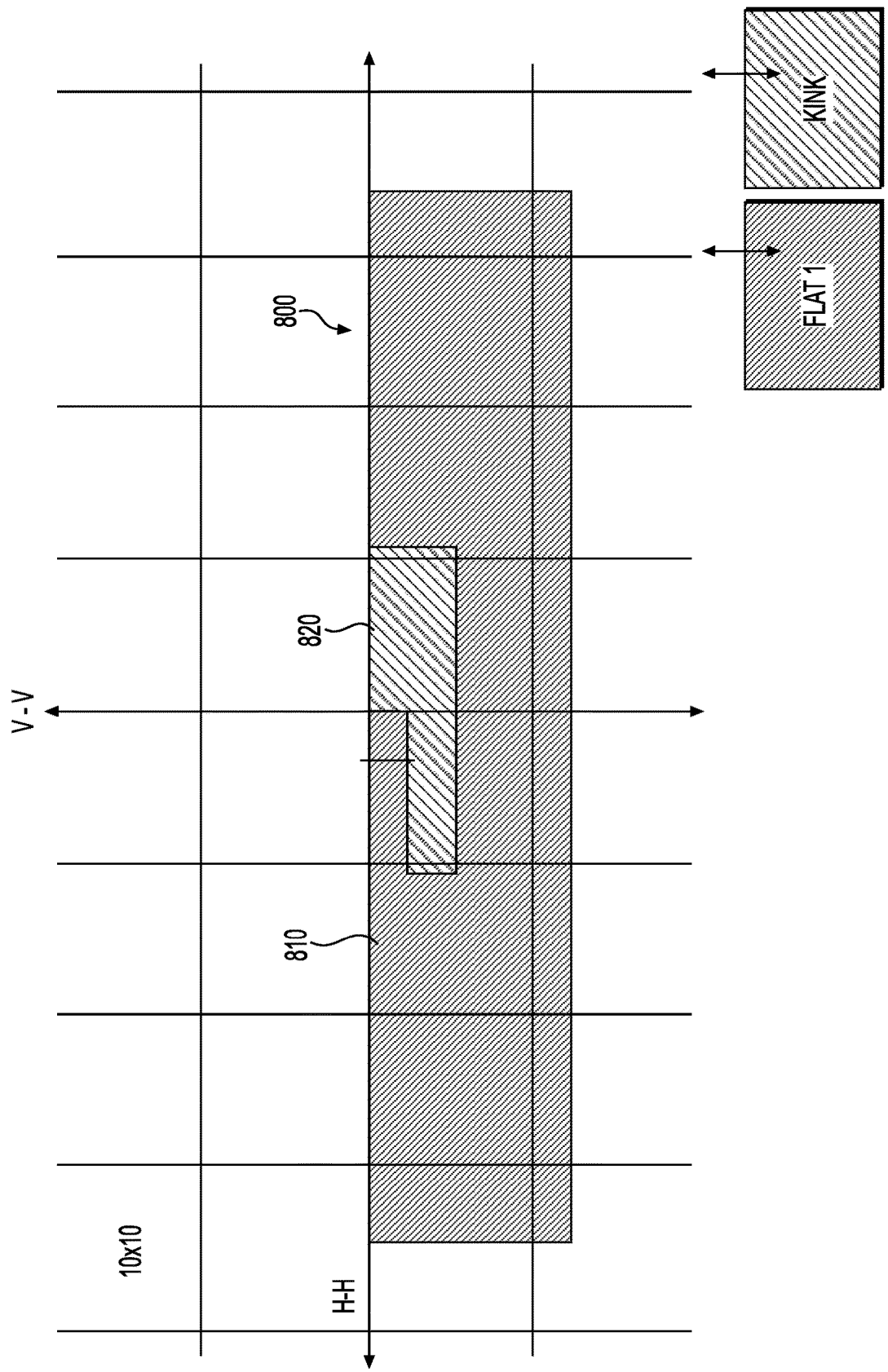

FIG. 8B illustrates the exemplary light fields of the low beam headlamp of FIG. 8A with the light fields redistributed by dynamic aiming, such as for driving on a roadway. As illustrated in the figure, the flat component has been rotated or otherwise displaced to raise flat light field 810 upwards by 0.4° and the kink component has been rotated or otherwise displaced to lower kink light field 820 downwards by 0.2°. The combined light field 800 is thus transformed to a VOR light field while the vehicle is in motion.

Figure 9:
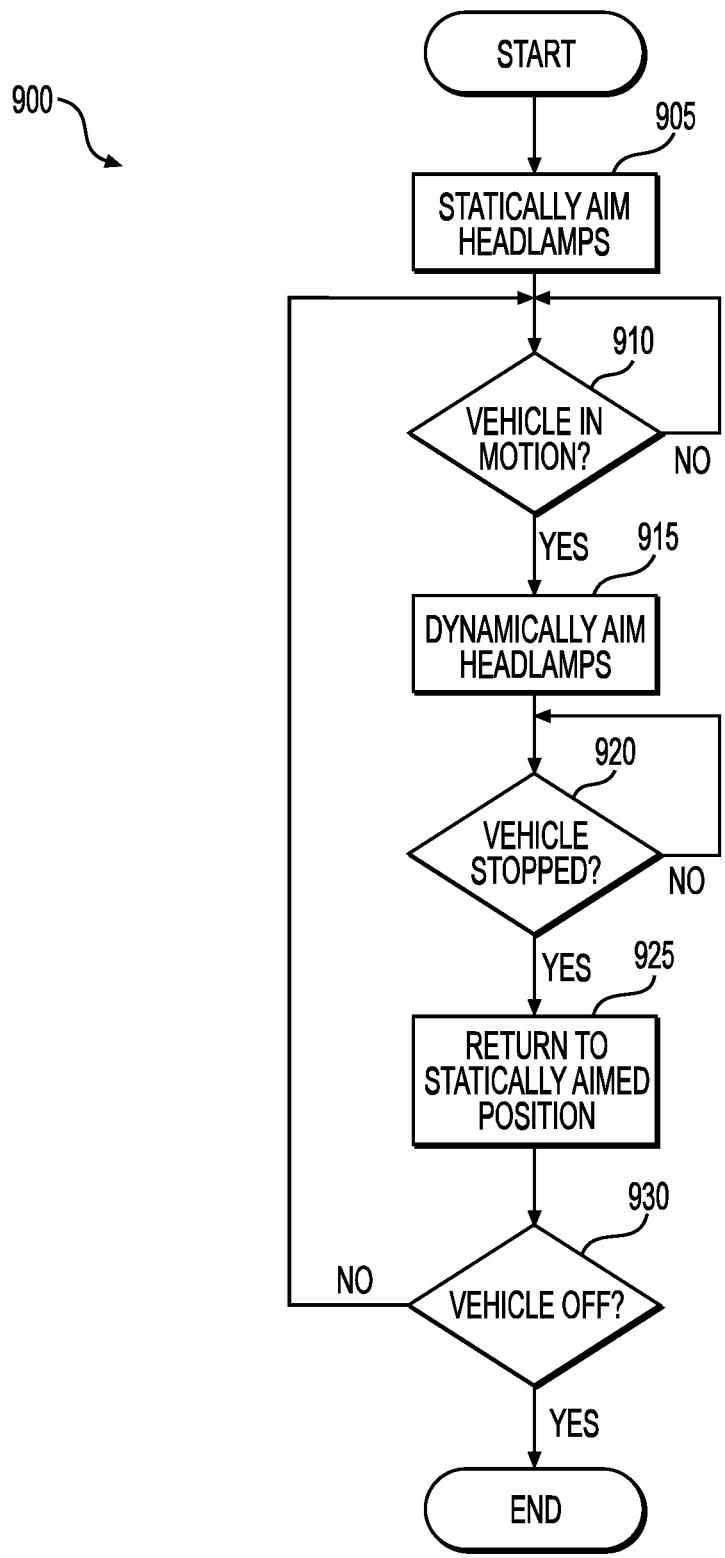
FIG. 9 is a flow diagram of an exemplary automotive lighting process 900 by which the present inventive concept can be embodied.

FIG. 9 is a flow diagram of an exemplary automotive lighting process 900 by which the present invention can be embodied. In operation 905, headlamps on a vehicle are statically aimed, such as by a conventional headlamp alignment procedure. In operation 910, it is determined whether the vehicle is in motion and, if so, process 900 may transition to operation 915, by which the headlamps are dynamically aimed in a direction other than that in which the headlamps were statically aimed. In operation 920, it is determined whether the vehicle is stopped and, if so, process 900 may transition to operation 925, by which the headlamps are returned to their statically-aimed position. In operation 930, it is determined whether the vehicle has been turned off or powered down and, if so, process 900 terminates. Otherwise, if the vehicle has not been turned off as determined in operation 930, process 900 may return to operation 910 and continue from that point.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of any means or step plus function elements in the claims below are intended to include any structure, material, or act for performing the function in combination with other claimed elements as specifically claimed. The embodiments disclosed herein were chosen and described in order to best explain the principles of the invention and the practical application, and to enable others of ordinary skill in the art to understand the invention for various embodiments with various modifications as are suited to the particular use contemplated.

The description of the present invention has been presented for purposes of illustration and description, but is intended to be neither exhaustive nor limited to the invention in the form disclosed. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:
1. An automotive lighting apparatus comprising:
a plurality of lighting components to generate respective light fields, the lighting components being aligned one with the others such that the light fields combine in a lighting profile having cutoff regions meeting a predetermined cutoff criterion, wherein one of the lighting components has a horizontal cutoff and another of the lighting components has a stepped cutoff;

at least one actuator mechanically coupled to a corresponding one of the lighting components to aim that lighting component in a direction along a vertical axis of that lighting component other than that in which the lighting component was aligned; and a control component to operate the actuator to aim the lighting component in the direction other than that in which the lighting component was aligned so that the light fields of the lighting components combine in another lighting profile having cutoff regions meeting another cutoff criterion.

2. The apparatus of claim 1, wherein the cutoff criterion specifies that the cutoff region is located 1°-3° right of the vertical axis of the lighting apparatus and on the horizontal axis of the lighting apparatus.

3. The apparatus of claim 2, wherein the direction other than that in which the lighting component was aligned is upwards along the vertical axis by 0.2°.

4. The apparatus of claim 1, wherein the cutoff criterion specifies that the cutoff region is located 1.5°-3.5° left of the headlamp vertical axis and 0.4° below the horizontal axis of the lighting apparatus.

5. The apparatus of claim 4, wherein the direction other than that in which the lighting component was aligned is upwards along the vertical axis by 0.4°.

6. The apparatus of claim 5, wherein the direction other than that in which another lighting component was aligned is downwards along the vertical axis by 0.2°.

7. An automobile comprising:

a plurality of lighting components to generate respective light fields, the lighting components being aligned one with the others such that the light fields combine in a lighting profile having cutoff regions meeting a predetermined cutoff criterion, wherein one of the lighting components has a horizontal cutoff and another of the lighting components has a stepped cutoff;

at least one actuator mechanically coupled to a corresponding one of the lighting components to aim that lighting component in a direction along a vertical axis of that lighting component other than that in which the lighting component was aligned; and a control component to operate the actuator to aim the lighting component in the direction other than that in which the lighting component was aligned so that the light fields of the lighting components combine in another lighting profile having cutoff regions meeting another cutoff criterion.

8. The automobile of claim 7, wherein the cutoff criterion specifies that the cutoff region is located 1°-3° right of the vertical axis of the lighting apparatus and on the horizontal axis of the lighting apparatus.

9. The automobile of claim 8, wherein the direction other than that in which the lighting component was aligned is upwards along the vertical axis by 0.2°.

10. The automobile of claim 7, wherein the cutoff criterion specifies that the cutoff region is located 1.5°-3.5° left of the headlamp vertical axis and 0.4° below the horizontal axis of the lighting apparatus.

11. The automobile of claim 10, wherein the direction other than that in which the lighting component was aligned is upwards along the vertical axis by 0.4°.

12. The apparatus of claim 11, wherein the direction other than that in which another lighting component was aligned is downwards along the vertical axis by 0.2°.

13. A method of automotive lighting comprising:

statically aiming a plurality of lighting components that generate respective light fields, the lighting components being aligned one with the others such that the light fields combine in a lighting profile having cutoff regions meeting a predetermined cutoff criterion, wherein one of the lighting components has a horizontal cutoff and another of the lighting components has a stepped cutoff; and dynamically aiming at least one of the lighting components in a direction along a vertical axis of that lighting component other than that in which the lighting component was statically aimed in response to a command issued by a controller so that the light fields of the lighting components combine in another lighting profile having cutoff regions meeting another cutoff criterion.

14. The method of claim 13, wherein the cutoff criterion specifies that the cutoff region is located 1°-3° right of the vertical axis of the lighting apparatus and on the horizontal axis of the lighting apparatus.

15. The method of claim 14, wherein the direction other than that in which the lighting component was aligned is upwards along the vertical axis by 0.2°.

16. The method of claim 13, wherein the cutoff criterion specifies that the cutoff region is located 1.5°-3.5° left of the headlamp vertical axis and 0.4° below the horizontal axis of the lighting apparatus.

17. The method of claim 16, wherein the direction other than that in which the lighting component was aligned is upwards along the vertical axis by 0.4°.

* * * * *